No. 739,047. PATENTED SEPT. 15, 1903.
M. H. WILSON.
SPRING SCALE.
APPLICATION FILED DEC. 11, 1901.
NO MODEL.
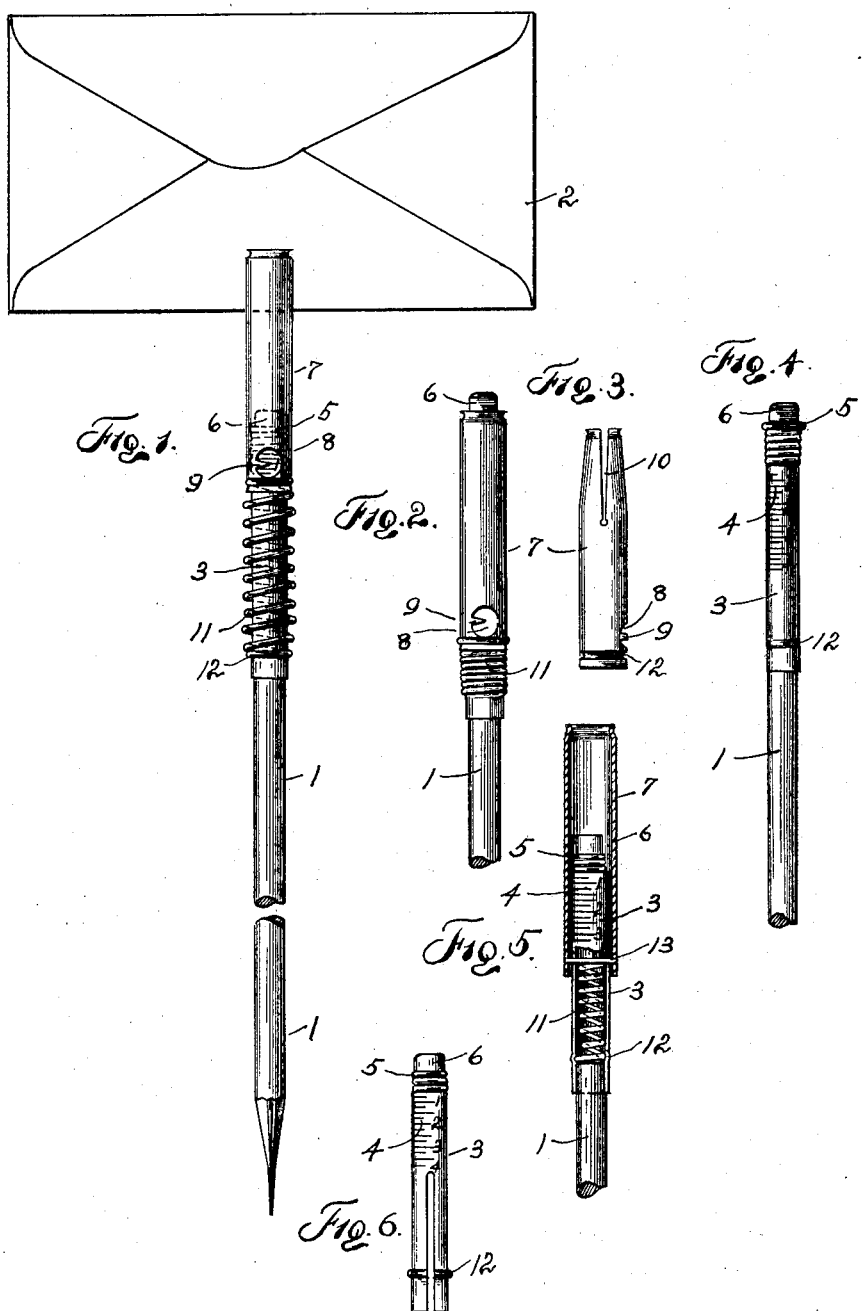
WITNESSES:
J. R. Keller
W. S. Armstrong
INVENTOR.
Michael H. Wilson
BY
W. G. Doolittle
ATTORNEY.

No. 739,047. Patented September 15, 1903.

UNITED STATES PATENT OFFICE.

MICHAEL H. WILSON, OF PITTSBURG, PENNSYLVANIA.

SPRING-SCALE.

SPECIFICATION forming part of Letters Patent No. 739,047, dated September 15, 1903.

Application filed December 11, 1901. Serial No. 85,428. (No model.)

*To all whom it may concern:*

Be it known that I, MICHAEL H. WILSON, a citizen of the United States, residing at Pittsburg, in the county of Allegheny and State of Pennsylvania, have invented certain new and useful Improvements in Spring-Scales; and I do hereby declare the following to be a full, clear, and exact description of the invention, such as will enable others skilled in the art to which it appertains to make and use the same.

The object of my invention is to provide a new and improved spring-scale; and to this end the present invention consists of a spring-scale particularly adapted for use with a pencil or similar article and in the construction and combination of parts, all as fully hereinafter described and particularly claimed.

In the accompanying drawings, which illustrate applications of my invention, Figure 1 is an elevational view embodying my invention, showing a letter in position to be weighed; Fig. 2, an elevational view showing the spring contracted and the parts in their normal positions; Fig. 3, a detail view of movable sleeve; Fig. 4, a side view of the device without the spring and sleeve; Fig. 5, a part-sectional view and a part-elevational view of a modification, and Fig. 6 a detail view of modified form of casing.

Referring to the drawings, I have shown my invention in connection with an ordinary lead-pencil 1 and in Fig. 1 have shown the manner of weighing a letter or other article, which is designated by the numeral 2.

In the forms of my invention as shown a casing or body portion 3, which is adapted to be fitted on an end of an ordinary lead-pencil, is provided with a graduated scale 4, and its upper end terminates in an annular rib or bead 5. A piece of rubber or an eraser 6 is preferably placed in the upper end of the casing. Surrounding the casing is a movable sleeve 7, having an opening 8 and a pointer 9. This opening 8 and pointer are so arranged in relation to the graduated scale 4 that the opening comes directly over the scale 4 as the movable sleeve travels up and down. Sleeve 7 is preferably made of some suitable spring metal and is slotted at its upper end, as shown, the slots 10 being adapted to receive and hold the letter or article being weighed. A coiled spring 11, fastened at one end to the sleeve and at its other end to the casing, exerts an upward pressure against the movable sleeve. In the drawings I have shown the upper end of the spring wound or fitted in an annular groove 12 in the sleeve and its lower end fastened in a similar manner in a groove in the casing. Attention is called to the form of sleeve preferably employed—that is to say, this sleeve 7 is of such a nature that when in the position shown by Fig. 1 it is out of contact with the casing and the annular rib 5 and is free to move while the article is being weighed. When the balance or scale is not being used, the sleeve may be placed in the position shown by Fig. 2, the upper end of the sleeve fitting under and being held down in place by the rib or bead 5.

In the form of Fig. 5 the spring 11 is within the casing instead of surrounding it, as in the other form illustrated, and is preferably held in place therein by making the last coil of the spring of a slightly-greater diameter than the other coils, so that when the spring is put in place within the casing this last coil enters the annular groove 12. The upper end of the spring bears against a cross-piece 13, which latter is secured to the movable sleeve 7. When this construction is employed, the casing 3 must be slotted to permit the travel of the cross-piece 13 therein, as particularly shown by Fig. 6. My invention provides a simple and convenient combined letter scale or balance and pencil-holder. It will be noted it is intended to be used in weighing articles without removing the device from the pencil. The constructions herein described and shown may be changed somewhat without departing from my invention, since

What I claim is—

1. A spring-scale, comprising a casing adapted to be placed on an end of a pencil or similar article, said casing provided with a graduated scale, a movable sleeve arranged to travel over the graduated scale, a spring connecting the movable sleeve and the casing arranged to coöperate with the movable sleeve in weighing an article, and means on the casing adapted to engage the movable sleeve for the purpose of keeping the spring contracted and maintaining the sleeve over the casing when the scale is not in use, substantially as set forth.

2. A spring-scale, comprising a casing adapted to be placed on an end of a pencil or similar article, said casing provided with a graduated scale, a movable sleeve adapted to hold an article to be weighed, said sleeve arranged to travel over the graduated scale and provided with a pointer, a spring surrounding the casing and connecting the movable sleeve and casing arranged to coöperate with the movable sleeve in weighing an article, and means for keeping the spring contracted and maintaining the sleeve over the casing when the scale is not in use, substantially as set forth.

3. In a combined letter-scale and pencil-holder, the combination, with a pencil, of a casing inclosing an end of the pencil having a graduated scale thereon and an annular rib at its upper end, a movable sleeve adapted to hold the article to be weighed and provided with an opening to permit the graduated scale to be seen and a pointer, a spring connected to the movable sleeve and arranged to coöperate with the sleeve in weighing an article, substantially as set forth.

4. A spring-scale adapted to be applied to a lead-pencil or similar article, comprising a casing, a movable sleeve, a spring having one end attached to the movable sleeve and its other to the casing and arranged to coöperate with the movable sleeve in weighing an article, and means on the casing engaging with the movable sleeve for maintaining the sleeve in its normal position, substantially as set forth.

In testimony whereof I affix my signature in presence of two witnesses.

MICHAEL H. WILSON.

Witnesses:
 LAURA E. HUBBARD,
 W. G. DOOLITTLE.